United States Patent
Lev et al.

(10) Patent No.: US 11,560,216 B2
(45) Date of Patent: Jan. 24, 2023

(54) SYSTEM AND METHOD FOR BRAKING FLYING OBJECTS

(71) Applicants: Vitaly Triger, Ashdod (IL); Anya Leshinsky-Altshuller, Kiriat Byalik (IL); Solomon Khmelnik, Bene-Ayish (IL)

(72) Inventors: Pinsker Lev; Vitaly Triger, Ashdod (IL); Anya Leshinsky-Altshuller, Kiriat Byalik (IL); Solomon Khmelnik, Bene-Ayish (IL)

( * ) Notice: Subject to any disclaimer, the term of this patent is extended or adjusted under 35 U.S.C. 154(b) by 107 days.

(21) Appl. No.: 16/622,615

(22) PCT Filed: Jun. 18, 2017

(86) PCT No.: PCT/IL2017/050671
§ 371 (c)(1),
(2) Date: Dec. 13, 2019

(87) PCT Pub. No.: WO2018/235064
PCT Pub. Date: Dec. 27, 2018

(65) Prior Publication Data
US 2021/0147070 A1     May 20, 2021

(51) Int. Cl.
*B64C 23/00* (2006.01)
*B64D 25/00* (2006.01)
(Continued)

(52) U.S. Cl.
CPC ............ *B64C 23/005* (2013.01); *B64D 25/00* (2013.01); *B64G 1/62* (2013.01); *H05H 1/2406* (2013.01); *H05H 1/2418* (2021.05)

(58) Field of Classification Search
CPC ........ B64D 25/00; B64D 17/02; B64D 17/10; B64D 19/00; B64C 23/005;
(Continued)

(56) References Cited

U.S. PATENT DOCUMENTS 5,826,827 A   10/1998   Coyaso et al.
6,761,334 B1   7/2004   Nutu et al.
(Continued)

FOREIGN PATENT DOCUMENTS

DE   102005052930 A1 *  5/2007  ............... F15D 1/12
EP     2340995 A2 *  7/2011  ............... F15D 1/12
EP     2340995 A2     7/2011

OTHER PUBLICATIONS

International search report for PCT/IL2017/050671 dated Oct. 2, 2017.
Written Opinion for PCT/IL2017/050671 dated Oct. 2, 2017.

*Primary Examiner* — Richard R. Green
*Assistant Examiner* — Madison Elizabeth Dittner
(74) *Attorney, Agent, or Firm* — The Roy Gross Law Firm, LLC; Roy Gross

(57) ABSTRACT

A system for slowing down the speed of flying objects by applying electrodynamic and aerodynamic braking forces. The system is comprised of plurality of stubs, where each stub is made of dielectric material surrounded by metal foil and another metal foil is inserted in the middle of the stub, where the outer metal foil and the inner metal foil are isolated from each other, so that they form a capacitor. Each stub is stored in a barrel before being used. When activated, the stubs are stretched from the barrel as a tail behind the flying object. The area of the stub generates aerodynamic drag. The stub capacitor is charged by a generator so that free electrons are present in the outer metal layer of the stub. The electric field produced by these charges interacts with ions in the atmosphere.

7 Claims, 3 Drawing Sheets

(51) Int. Cl.
*B64G 1/62* (2006.01)
*H05H 1/24* (2006.01)

(58) Field of Classification Search
CPC .... B64C 2230/12; B64G 1/62; H05H 1/2418; H05H 1/2406; A63H 27/00; A63H 33/40
USPC .......................................... 446/34, 176, 217
See application file for complete search history.

(56) References Cited

U.S. PATENT DOCUMENTS

| | | |
|---|---|---|
| 7,523,891 B2 | 4/2009 | Hakki et al. |
| 8,123,170 B2 | 2/2012 | Barrientos |
| 8,235,072 B2 * | 8/2012 | Roy .......................... F15D 1/12 137/825 |
| 2008/0142635 A1 | 6/2008 | Manfredi et al. |
| 2013/0291979 A1 * | 11/2013 | Nordin .................. B82Y 30/00 137/803 |

* cited by examiner

SYSTEM AND METHOD FOR BRAKING FLYING OBJECTS

CROSS REFERENCE TO RELATED APPLICATION

This application claims the benefit of U.S. Provisional Patent Application 62/469,156 filed on 9 Mar. 2017, which is incorporated herein by reference.

TECHNICAL FIELD

The present invention relates in general, to the field of aviation and in particular, to a method and system that supports air vehicle braking for supporting safe landing.

BACKGROUND ART

Since the dawn of aviation aircraft crashes have been much publicized. Today air travel is considered one of the safest, and yet we are still in awe when a civilian aircraft crashes down. This is mainly due to the large number of people that inhabit each of these flights. The problem was, and remains, that once airborne, a damaged aircraft cannot land as regularly but crashes down or performs an emergency landing. These two options may cause injuries or massive loss of life. To this day no system has been invented that could help mitigate the damage and allow an airborne aircraft, once damaged or malfunctioned, to reasonably safely land on the ground or water, with minimal damage.

Such systems, of course, have been suggested before. One such system used in the commercial market is intended for the recovery of small single engine planes. This system, produced by BRS Aerospace, uses a single parachute that deploys if the aircraft departs controlled flight. This method, though, is only applicable to small aircraft that fly at slow speed and the breaking force delivered by the parachute is not as strong as one necessary to slow a jet airliner.

U.S. Pat. No. 8,123,170 "Recovery and Rescue System for Aircraft" describes a system intended for small aircraft. This system, it is mentioned, can be upgraded to fit larger jets up to business jets. This patent describes the use of a single sail that automatically launches in an emergency. The use of a sail has its advantages of the sudden breaking power of a parachute, but the system does not offer a complete solution to all aircraft and is generally limited to small aircrafts.

U.S. Pat. No. 6,761,334 "Aircraft Passenger Safety Module" describes a system were the passengers in an airliner will sit in a module that can be separated in the event of an emergency. After the separation, parachutes can open to allow for the safe landing of the passenger module. This system will require an elaborate construction and pyrotechnics to fit into existing airframes (if possible). In addition, the use of parachutes in high capacity, high weight, high flying and high-speed jet planes can be as dangerous as a crash. Using a parachute at high speeds can cause a breaking force that could tear the module apart or even injure or kill the passengers inside it. A successful method must first slow down the plane and only open the parachutes when it is safe to do so.

US Pat. Publication No. 2008/0142635 "Aircraft Safety System" describes a system of parachutes designed to help safely down an airliner during an emergency. In this patent, the aircraft's wings are taken off and landed separately from the body, thus reducing the weight of the aircraft. However, again, the single use of parachutes for breaking purposes can be very dangerous in highflying high-speed airliners. This patent also includes a fuselage to facilitate a gentler touchdown of the aircraft, even without the deployed landing gear.

U.S. Pat. No. 5,826,827 "Air-Chute Safety System" describes yet another recovery patent that uses several parachutes to help land a jetliner in an emergency. This system, again, uses only parachutes for the recovery operation.

U.S. Pat. No. 7,523,891 "Safety Pre-Impact deceleration System For Vehicles" describes a rescue system comprised of inflatable airbags that enables to smoothly decelerate the speed of the air vehicle. Another method described in the patent is the use of canopy with orifices that can be controlled. In addition, airbags are inflated around the vehicle to ease the landing impact.

The major deficiency in the above-described patents is that the deceleration is very high, at a level that can harm people within the vehicle.

Space craft reentering the atmosphere fly at a very high speed, and they have no means for reducing their speed before entering the atmosphere. Hence they have to protected against high temperature which is generated during the reentrancy. The weight of the heat protection means constitutes significant part of the weight of the vehicle.

Thus, a different approach that will assure gradual slowdown of the vehicle's speed is required both for air vehicles within the atmosphere and for air vehicles in space before reentering the atmosphere.

SUMMARY OF INVENTION

Described hereafter is a system for slowing down the speed of flying objects by applying electrodynamic and aerodynamic braking forces, the system is comprised of plurality of stubs, where each stub is made of dielectric material surrounded by metal foil and another metal foil is inserted in the middle of the stub, where the outer metal foil and the inner metal foil are isolated from each other, so that they form a capacitor.

Each stub, before the braking force is activated, is stored in a barrel which is firmly attached to the flying object. The stub is folded in the barrel. When braking force is required, the stub leaves the barrel and is opened as a tail behind the flying object. A generator located in the flying object for providing high DC voltage to charge the capacitor formed by the stub.

The aerodynamic drag is created by the interaction of the spiral stub with air. The aerodynamic drag force is a function of the area spanned by the spiral stub and the speed of the stub. The electrodynamic deceleration is generated by interaction between ions presented in the atmosphere and the negative charges on the outer metal foil of the stub that has free electrons. The energy given to the ions is taken from the kinetic energy of the flying object.

DETAILED DESCRIPTION

The invention will be described more fully hereinafter, with reference to the accompanying drawings, in which certain possible embodiments of the invention are shown. The invention may, however, be embodied in many different forms and should not be construed as limited to the embodiments set forth herein; rather these embodiments are provided so that the disclosure will be thorough and complete, and will fully convey the scope of the invention to those skilled in the art.

Figures 1A, 1B:
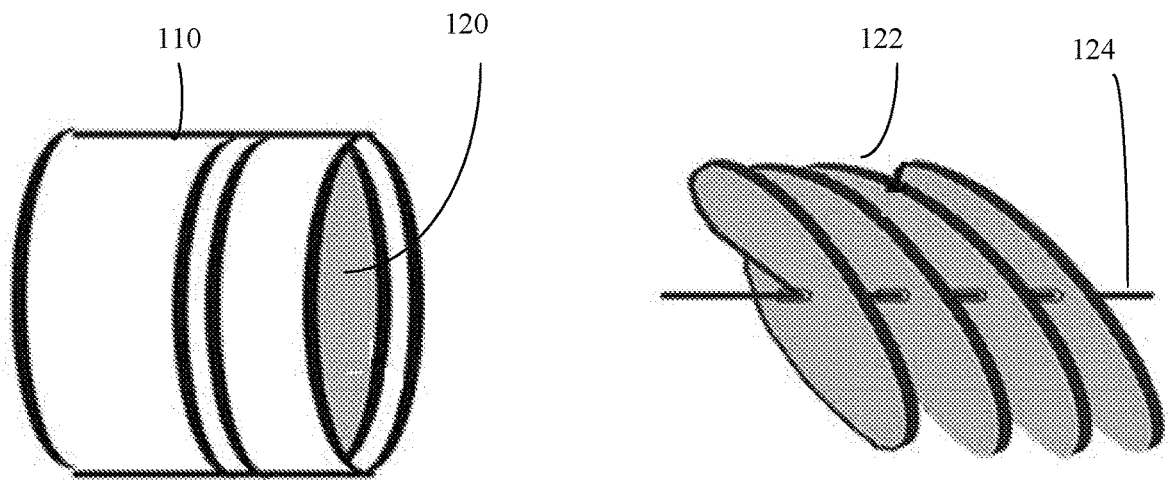
FIG. 1a provides description of the barrel.
FIG. 1b shows the structure of the stub within the barrel.
Figure 1C:
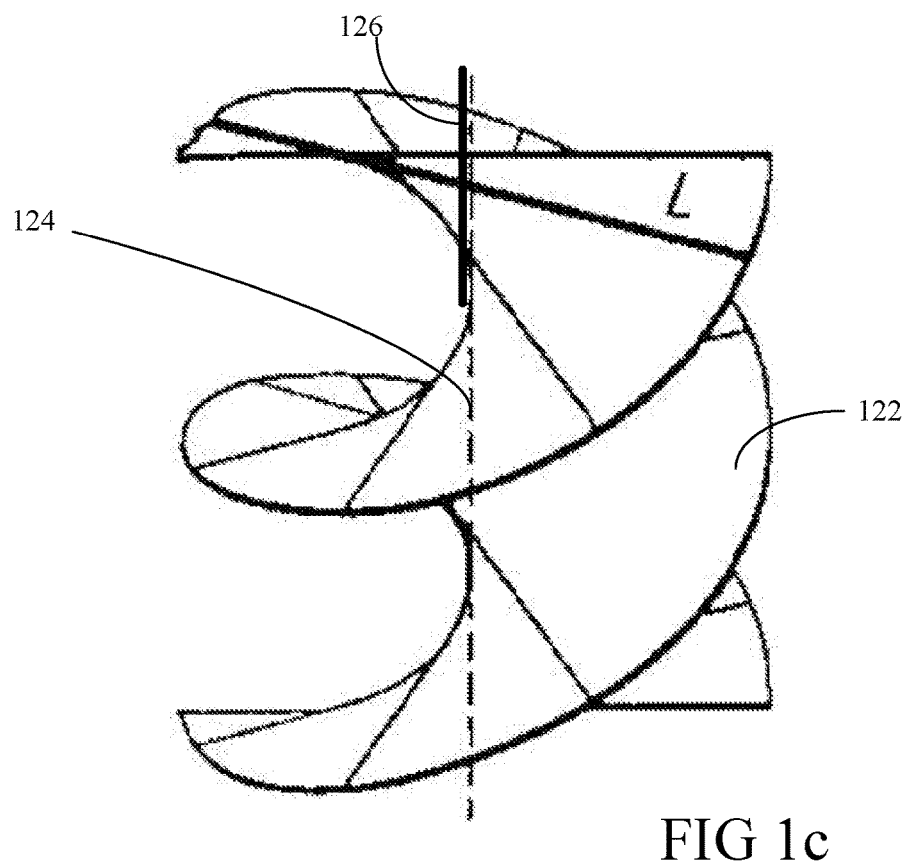
FIG. 1c shows detailed structure of the open stub.

The disclosed method uses a system that generates electrodynamic deceleration and aerodynamic drag. At high altitudes the electrodynamic deceleration enables to slow down satellite reentrant speed, and the aerodynamic drag supports the final landing phase. The braking system is comprised of plurality of barrels as shown in FIG. 1a 110, where each barrel stores a compressed helical shaped ribbon 120. The structure of the helical shaped ribbon is shown in FIG. 1b. FIG. 1b shows the structure of the stub within the barrel whereby compressed helical shaped ribbon is shown in an open configuration having an outer surface 122 along a longitudinal axis 124. FIG. 1c presents a section of the fully opened ribbon and shows a detailed structure of the open stub having an upper surface 126. The barrels can be securely fixed to the flying object, the speed of which has to be reduced, and when opened, the ribbon travels with the flying object. In another embodiment the barrels can be securely fixed to the object carrying the flying object, such as aircraft or space station, and the stub is fixed to the flying object, and is released from the barrel after it is opened. We shall refer to the opened ribbon from this point on as the stub. Opening the ribbon is referred to as stub activation.

Typical dimensions of the ribbon in a barrel are:
Number of Turns=2000
Length of the ribbon (L)=630 m.
Dielectric constant ($\varepsilon$)=2.
Weight of stub=6 Kg.
Breakout voltage of dielectric material=40 Kg/mm.

Figure 2:
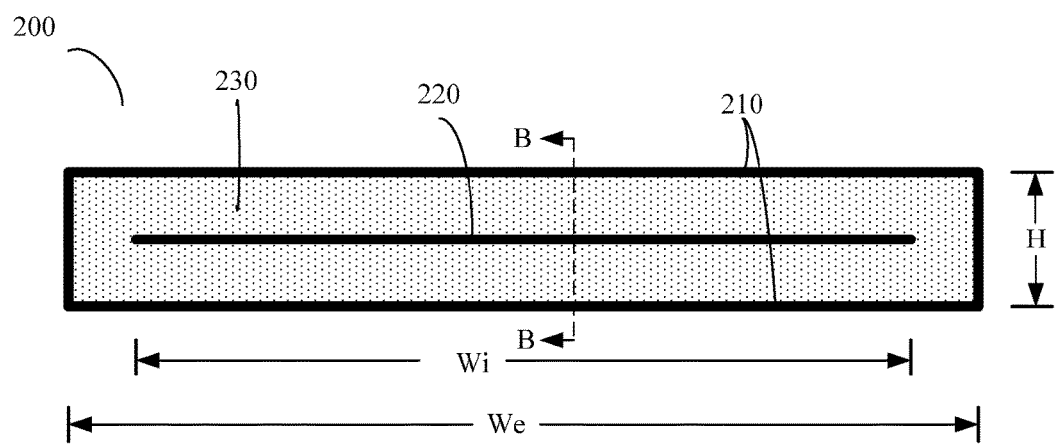
FIG. 2 presents cross-section of the stub.

Cross-section A-A in FIG. 1b of the stub is shown in FIG. 2. The stub 200, is made out of a dielectric tape 230 of width We and height H. The outer perimeter of the stub is a metal foil 210 and in the middle of the stub there is a metal foil 220 of width Wi. Typical dimensions of the stub are: We=0.1 m, Wi=0.09 m, H=0.00005 m.

The stub is built as a capacitor. The capacitance of the stub capacitor having the dimensions presented above is:

$$C=2\ \varepsilon_0 \varepsilon L\ Wi/0.5H \approx 0.0016C$$

where $\varepsilon_0$ is vacuum permittivity and is relative permittivity.

First we refer to the aerodynamic drag. This drag force $F_d$, can be computed by the following formula:

$$F_d = \rho A C_d V^2/2 \quad (1)$$

Where: $\rho$ is air density [kg/m$^3$];
A is stub area in open state [m$^2$];
$C_d$ is drag coefficient which depends on the shape of the body;
V is the velocity of the body [m/s].

As an example, let us consider a case where the weight of a satellite is 5 Kg. to slow down to a constant speed, a drag force of 50 N is required (compensation for gravity acceleration). From equation (1) we can find the required area of the stub:

$$A = 2F/(\rho C_d V^2) \quad (2)$$

We can assume that $C_d=1$, taking into consideration that in open state there is interaction between spirals of the open ribbon. We also assume that during landing the speed of the satellite is 5 m/s. Air density $\rho=1.2$ Kg/m$^3$. Using these value we get that the required area is 3.33 m$^2$. Using the dimensions of the stun given above, and assuming stub material density of 1440 Kg/m$^3$, the mass of the stub is 0.24 Kg.

Let us refer now to the electrodynamic drag generated by the same stub. A cross section of the stub along line B-B in FIG. 2 is presented in FIG. 3. The stub 300 is in open state and is connected to the satellite 310. In the satellite there is a generator that is charging the stub capacitor. As described earlier, the stub capacitor is comprised of the metal layers 210 at the outer side of the stub and an inner metal layer 220 within the dielectric material 230 of the stub. The outer metal plates are connected to the negative terminal of the generator 320 and the inner metal layer is connected to the positive terminal of the generator 320. On the surface of the stub there are free electrons 330 and in the atmosphere there are positive ions 340.

We can view the charged stub moving in the speed of the satellite V, as a wire having negative charge density Q Cb/m moving at speed of V m/s as carrying a constant current J given by:

$$J = V \cdot Q \quad (3)$$

Figure 4:
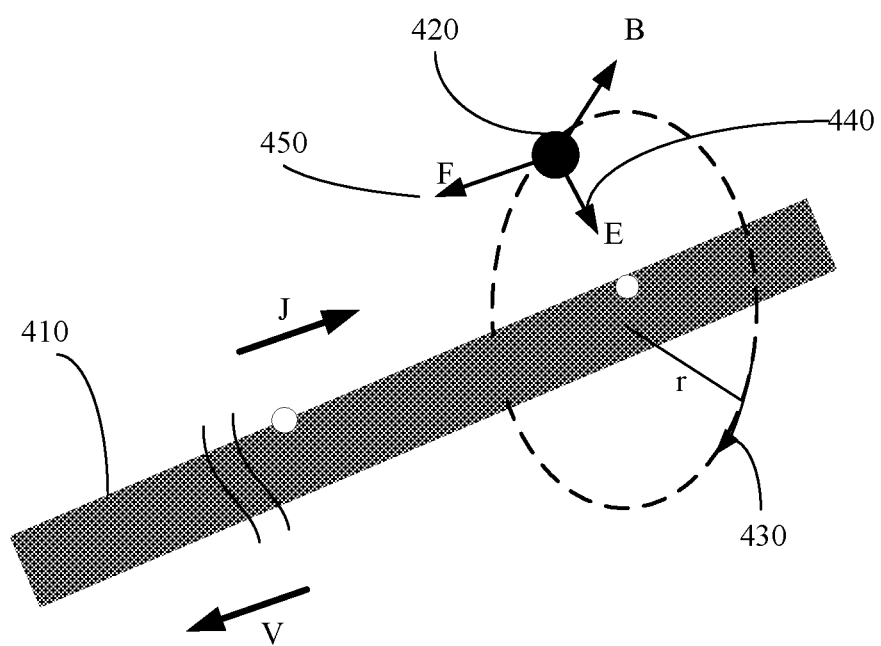
FIG. 4 presents the currents and forces in the system.

This is demonstrated in FIG. 4. The stub 410 moves at a speed V with the free electrons, thus a positive current J is generated. A circular magnetic field 430 is generated around the stub 410, the intensity B of which depends on the radius r. The magnetic field B(r) is given by:

$$B(r) = \mu_0 J/(2\pi r) \quad (4)$$

Where $\mu_0$ is the magnetic permeability of air (which we assume is equal to the magnetic permeability of vacuum).

At the same distance r there is a positive ion 420 with charge p that is attracted to the negative charge in the stub with electric force E(r) given by:

$$E(r) = Q \cdot p/(2\varepsilon_0 r^2) \quad (5)$$

where p is the charge of the ion. The electric force E(r) 440 acting on the ion 420 causes it to move with speed of w(r) towards the stub. That generates a Lorentz force F 450 on the ion 420 directed in the direction of the stub velocity V, where the magnitude of the force is given by:

$$F(r) = p \cdot w(r) \cdot B(r) \quad (6)$$

The work done on the moving ion 420 is taken from the kinetic energy of the satellite, thus the kinetic energy is reduced, so the satellite slows down.

We continue with the computation of the power spent by the stub for the attraction of the ion. The ion is initially at a distance L from the stub. It moves, due the forces acting on it, towards the stub until it picks up an electron, and is neutralized. The ion picks up the electron at a distance $\delta$ from the stub. This distance is of the order of magnitude of the ion ($10^{-9}$). The work A done by the force F(r) over the entire region L is given by:

$$A = \int_\delta^L F(r) \cdot dr = \int_\delta^L p \cdot w(r) \cdot B(r) \cdot dr \quad (7)$$

And after substituting the value of B(r) from equation (4) above we get:

$$A = \frac{\mu 0 \cdot J \cdot p}{2\pi} \int_\delta^L w(r) \cdot \frac{1}{r} \cdot dr \quad (8)$$

The average power P spent by the stub for the attraction of the ion is:

$$P = \frac{A}{T} \quad (9)$$

where T is the time the ion moves till it is neutralized be an electron in the stub. By carrying out the above calculations it can be seen that the average power P increases sharply when δ decreases. Since the exact value of δ is unknown, we will assume that $P=10^{-10}$ W. (This value is determined on the basis of mathematical modelling).

We shall define the relative average power with respect to stub speed as:

$$P_v = \frac{P}{V} = 1.2 \cdot 10^{-14} \text{ W/m/s for } V = 8000 \text{ m/s} \quad (10)$$

The power for the entire stub is:

$$M = P_v \cdot v \cdot N \quad (11)$$

where N is the number of ions captured by the stub in one second. Obviously N is equal to the number of electrons in the stub which were lost for neutralizing the ions. Thus the charge loss per second by the stub which equals the stub discharge current is given by:

$$J = e \cdot N; e = 1.610^{-19} Cb \text{(the electron charge)} \quad (12)$$

Figure 3:
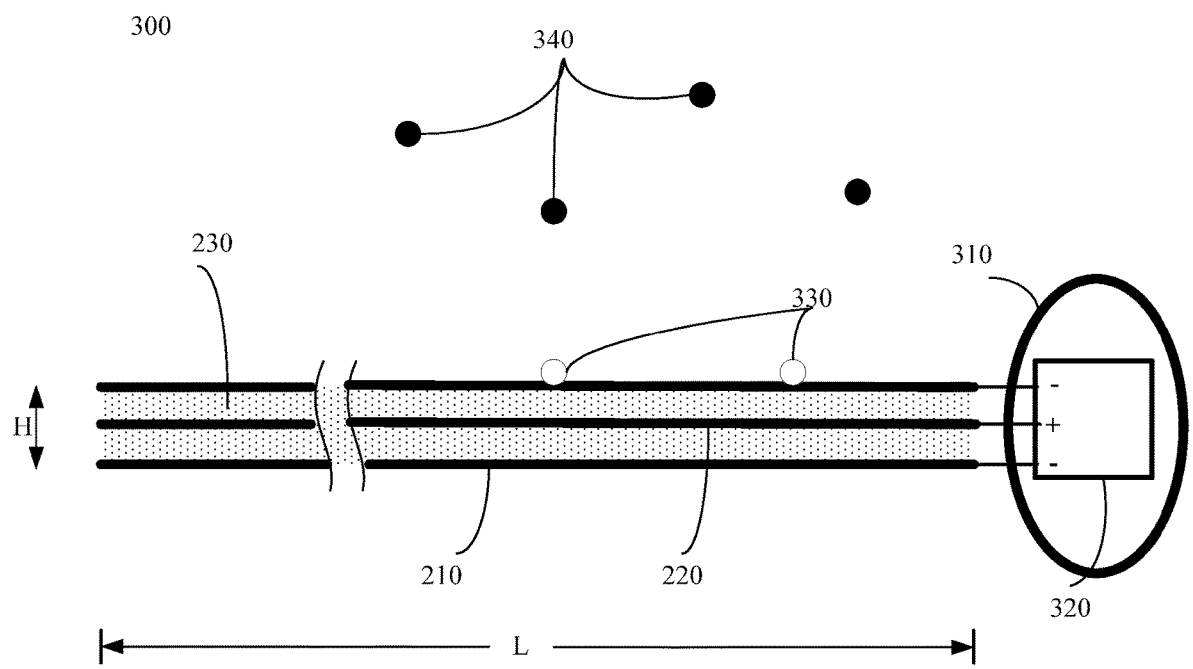
FIG. 3 shows schematic view of the stub connected to the generator.

The discharge current is compensated for by charging current provided by the generator installed in the satellite 320 in FIG. 3. From equations (11) and (12) we can write the expression for the braking power developed by the stub as:

$$M = P_v \cdot v \cdot J/e \approx 10^5 \cdot J \cdot V \quad (13)$$

And the braking force:

$$F_T = M/V \approx 5 \cdot 10^{12} J \quad (14)$$

The design should be such that the generator constantly replaces the lost charge in the stub capacitor so there are enough electrons to neutralize the ions. The power M is received from the atmosphere. To obtain it, the device must consume its own power for the current generation Γ. Initially the generator must charge the stub capacitor to a certain charge density, and then add charge as the density decreases by the current of the ions. The current of the generator is:

$$J = L \frac{dQ}{dt}; \quad (15)$$

L is the length of the stub.

Note that the device will be effective if Γ<<M.

Also, in order for the device to operate there must be sufficient number of ions in the atmosphere. We assume that the number of ions is sufficient if $$K_e = \zeta \cdot 10^6 \cdot K_i; \quad (16)$$

where Ke represents the number of electrons in the stub, Ki is the number of ions in a volume equal to the volume of the stub, The coefficient ζ>>1.

Note that due to the structure of the stub, when the external metal plates are negatively charged and the inner metal plate is positively charges, positive ions from the surrounding space come closer to the stub while negative ones move away. This is despite the presence of positive and negative ions in the atmosphere.

Using the equations presented above, the parameters of a stub and the generator for providing require braking force and power can be evaluated. A braking force of 250 N for a satellite traveling at a speed of 8000 m/a can be achieved by a 500 m long stub which weights 6.3 Kg, where the generator provides 1 Watt at 800V supplying current of 0.5 mA. A similar braking force can be achieved by 100 m long stub weighting 1.26 Kg, where the generator provides 2 Watt at 800V supplying current of 2.5 mA.

Plurality of barrels can be attached to a flying object, each storing a stub. The barrel contains stub opening mechanism that is activated by a control unit. The control unit activates the stubs according to pre planed program and/or as response to real time flight information.

Note that the disclosed system enables to adjust the electrodynamic drag force by controlling the charging current of the stub capacitor What has been described above are just a few possible embodiments of the disclosed invention. It is of course, not possible to describe every conceivable combination of components and/or methodologies, but one of ordinary skill in the art may recognize that many further combinations and permutations are possible. Accordingly, the invention is intended to embrace all such alterations, modifications, and variations that fall within the spirit and scope of the invention.

What is claimed is:

1. A system for slowing down the speed of a flying object by applying electrodynamic and aerodynamic braking forces, the system comprised of:
   a. plurality of stubs, where each stub is made of dielectric material surrounded by metal foil and another metal foil is inserted in the middle of the stub, where the outer metal foil and the inner metal foil are isolated from each other, so that they form a capacitor;
   b. plurality of barrels, each one stores a stub in a folded state before the braking force is activated, the barrels are firmly attached to the flying object;
   c. a generator located in the flying object for providing high DC voltage to charge the capacitor formed by the stub; and
   d. control mechanism that activates each of the stubs for slowing down the speed of the flying object.

2. The system of claim 1, where the stub is stored in the barrel as helical shaped ribbon.

3. The system of claim 1, where the stub has rectangular cross section.

4. The system of claim 1, where a generator for each stub is located in the barrel containing the stub.

5. The system of claim 1, where the control mechanism can activate stubs according to pre prepared plan and/or according to real flight conditions.

6. A method for slowing down the speed of a flying object by applying electrodynamic and aerodynamic braking forces, the method is comprised of:
   a. attaching a plurality of stubs to the flying objects and opening them to slow down the speed of the flying object;
   b. charging the capacitor built in the stub by a DC generator which causes interaction between ions in the atmosphere and the negative charges on the stub, which absorbs kinetic energy from the flying object; and
   c. generation of aerodynamic drag by the stub which is a function of the stub area and the object speed.

7. A method of claim 6 where the electrodynamic braking force depends on the size of the stub and the charging current provided by the generator.

\* \* \* \* \*